United States Patent
Masuda et al.

(10) Patent No.: US 8,329,298 B2
(45) Date of Patent: Dec. 11, 2012

(54) HEAT-EXPANDABLE MICROSPHERES AND A PROCESS FOR PRODUCING THE SAME

(75) Inventors: Toshiaki Masuda, Yao (JP); Kenichi Kitano, Yao (JP); Katsushi Miki, Yao (JP); Takeshi Inohara, Yao (JP); Takayuki Aoki, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 1075 days.

(21) Appl. No.: 12/067,771

(22) PCT Filed: Oct. 4, 2006

(86) PCT No.: PCT/JP2006/320250
§ 371 (c)(1),
(2), (4) Date: Mar. 21, 2008

(87) PCT Pub. No.: WO2007/046273
PCT Pub. Date: Apr. 26, 2007

(65) Prior Publication Data
US 2009/0176098 A1    Jul. 9, 2009

(30) Foreign Application Priority Data
Oct. 20, 2005   (JP) .................................. 2005-334927

(51) Int. Cl.
*C08J 9/16*      (2006.01)
*B32B 15/02*     (2006.01)

(52) U.S. Cl. ..................... 428/407; 521/56; 428/402.21; 428/402.2; 428/402; 428/402.22

(58) Field of Classification Search ..... 428/402–402.24, 428/407, 403, 423.1, 474.4; 427/389.9, 213.3–213.36; 264/53, 41, 4–4.7
See application file for complete search history.

(56) References Cited

U.S. PATENT DOCUMENTS

| | | | |
|---|---|---|---|
| 3,615,972 A | | 10/1971 | Morehouse et al. |
| 3,740,359 A | * | 6/1973 | Garner ........................... 521/57 |
| 6,235,394 B1 | * | 5/2001 | Shimazawa et al. ..... 428/402.21 |
| 6,365,641 B1 | * | 4/2002 | Masuda et al. ................... 521/56 |
| 6,984,347 B2 | | 1/2006 | Masuda et al. |
| 2003/0114546 A1 | | 6/2003 | Satake et al. |
| 2003/0143399 A1 | | 7/2003 | Satake et al. |
| 2006/0063000 A1 | | 3/2006 | Tokumura et al. |
| 2007/0154711 A1 | | 7/2007 | Masuda et al. |

FOREIGN PATENT DOCUMENTS

| | | |
|---|---|---|
| EP | 1 811 007 A1 | 7/2007 |
| JP | 2002-012693 A | 1/2002 |

(Continued)

*Primary Examiner* — James J Seidleck
*Assistant Examiner* — S. Camilla Pourbohloul
(74) *Attorney, Agent, or Firm* — Global IP Counselors, LLP

(57) ABSTRACT

A method that heat-expandable microspheres includes the use of a shell of thermoplastic resin and a non-fluorine blowing agent encapsulated therein having a boiling point not higher than the softening point of the thermoplastic resin. The method includes, a step of dispersing an oily mixture containing a polymerizable component, the blowing agent, and a polymerization initiator containing a peroxydicarbonate in an aqueous dispersing medium to polymerize the polymerizable component contained in the oily mixture. The resultant heat-expandable microsphres have a shell which is less apt to become thinner than its theoretical value, contain minimum amount of resin particle inside their shell, and have excellent heat-expanding performance.

3 Claims, 1 Drawing Sheet

FOREIGN PATENT DOCUMENTS

| | | |
|---|---|---|
| JP | 2003-220329 A | 8/2003 |
| JP | 2004-091517 A | 3/2004 |
| JP | 2005-103469 A | 4/2005 |
| JP | 2005-232274 A | 9/2005 |
| JP | 2005-254214 A | 9/2005 |
| JP | 2006-002133 A | 1/2006 |
| JP | 2006-045532 A | 2/2006 |
| WO | WO-99/43758 A | 9/1999 |
| WO | WO-03/099955 A | 12/2003 |
| WO | WO-2004/058910 A | 7/2004 |
| WO | WO-2005/049698 A | 6/2005 |

* cited by examiner

HEAT-EXPANDABLE MICROSPHERES AND A PROCESS FOR PRODUCING THE SAME

CROSS-REFERENCE TO RELATED APPLICATIONS

This U.S. National stage application claims priority under 35 U.S.C. §119(a) to Japanese Patent Application No. 2005-334927, filed in Japan on Oct. 20, 2005, the entire contents of which are hereby incorporated herein by reference.

FIELD OF THE INVENTION

The present invention relates to heat-expandable microspheres, and a production process thereof.

BACKGROUND OF THE INVENTION

Heat-expandable microspheres which have a structure comprising a shell of thermoplastic resin and a blowing agent encapsulated therein are generally called heat-expandable microcapsules. Thermoplastic resins usually used for the purpose of making such heat-expandable microspheres include vinylidene chloride copolymers, acrylonitrile copolymers, and acrylic copolymers, and blowing agents mostly employed are hydrocarbons, such as isobutene and isopentane. (Refer to U.S. Pat. No. 3,615,972)

Such heat-expandable microcapsules are processed into lightweight hollow particulates (heat-expanded microspheres) by heating and expanding. The hollow particulates are employed in various uses, for example, lightening various materials.

The heat-expandable microcapsules are usually produced in suspension polymerization in which an oily mixture comprising a polymerizable component, a blowing agent, and a polymerization initiator is dispersed in an aqueous dispersing medium, and the polymerizable component in the oily mixture are polymerized.

At the polymerization step, all of thermoplastic resin converted from the polymerizable component should preferably constitute the shell of the microcapsules. An example of such heat-expandable microcapsules is shown in FIG. 1. In an actual process, however, all of thermoplastic resin converted from the polymerizable component does not necessarily constitute the shell of heat-expandable microcapsules, and it is often observed that some of the thermoplastic resin is formed into particulates to exist inside the shell of resultant heat-expandable microcapsules. Specifically such phenomenon is noticeable when microcapsules have a comparatively large particle size (for example, a particle size of 25 micrometers or more) or high expansion-initiating temperature (for example, an expansion-initiating temperature not lower than 110 deg.C.). An example of heat-expandable microcapsules containing resin particulates inside their shell (multinucleus microspheres mentioned below) is shown in FIG. 2.

When a lot of such resin particulates are generated, the thickness of the shell (hereinafter sometimes referred to as shell thickness or membrane thickness) of resultant microcapsules becomes thinner than its theoretical value. Such shell prevents the heat-expandable microcapsules from expanding sufficiently to a desirable degree in heating and expanding process, and makes the resultant hollow microspheres have a true specific gravity greater than an expected level, or causes low heat-expandability, such as low expansion ratio, of the heat-expandable microcapsule. Thus the generation of the resin particulates must be controlled, though the control means has not been specifically studied yet.

SUMMARY OF THE INVENTION

Technical Problem

The object of the present invention is to provide heat-expandable microspheres, which have a shell being less apt to become thinner than its theoretical value, contain minimized amount of resin particulates inside their shell, and have excellent heat-expandability; and to provide a production process thereof.

Technical Solution

For solving the problems described above, the inventors of the present invention have studied diligently and drawn out a conclusion that in the polymerization for producing heat-expandable microspheres with a specific polymerization initiator, the phenomenon of resin particulates existing in the shell of heat-expandable microspheres is controlled, the shell is less apt to become thinner than its theoretical value, and the resultant heat-expandable microspheres have excellent heat-expandability. Furthermore, the inventors also found that the polymerization initiator is remarkably effective for heat-expandable microspheres having comparatively large particle size (for example, a particle size of 25 micrometers or more) or high expansion-initiating temperature (for example, an expansion-initiating temperature not lower than 110 deg.C.), and attained the present invention.

Thus the method of producing heat-expandable microspheres of the present invention, each heat-expandable microspheres comprising a shell of thermoplastic resin and a non-fluorine blowing agent encapsulated therein having a boiling point not higher than the softening point of the thermoplastic resin, comprises the step of dispersing, in an aqueous dispersing medium, an oily mixture which contains a polymerizable component, the blowing agent, and a polymerization initiator including a peroxydicarbonate, and then polymerizing the polymerizable component contained in the oily mixture.

The heat-expandable microspheres of the present invention each comprise a shell of thermoplastic resin and a non-fluorine blowing agent encapsulated therein having a boiling point not higher than the softening point of the thermoplastic resin; have an average particle size ranging from 1 to 100 micrometers and a retention of the encapsulated non-fluorine blowing agent ranging from 5 to 30 weight percent; and satisfy at least two of the following conditions from (1) to (6) when the percentage of the average shell thickness to the average particle size of the whole of heat-expandable microspheres is defined as K, and the percentage of the average shell thickness to the average particle size of heat-expandable microspheres having particle sizes in each of the ranges, 20+/−2 micrometers, 30+/−3 micrometers, 35+/−4 micrometers, 40+/−4 micrometers, 50+/−5 micrometers, and 60+/−6 micrometers is defined as R.

(1) the percentage of R/K for the particle size range of 20+/−2 micrometers: 92% or more
(2) the percentage of R/K for the particle size range of 30+/−3 micrometers: 94% or more
(3) the percentage of R/K for the particle size range of 35+/−4 micrometers: 88% or more
(4) the percentage of R/K for the particle size range of 40+/−4 micrometers: 80% or more
(5) the percentage of R/K for the particle size range of 50+/−5 micrometers: 65% or more (6) the percentage of R/K for the particle size range of 60+/−6 micrometers: 55% or more Another heat-expandable microspheres of the present invention each comprise a shell of thermoplastic resin and a non-fluorine blowing agent encapsulated therein having a boiling point not higher than the softening point of the thermoplastic resin; have an average particle size ranging from 1 to 100 micrometers, and a retention of the encapsulated non-fluorine blowing agent ranging from 5 to 30 weight percent; and when the heat-expandable microspheres are sorted with meshes each having an opening of 25 micrometers, 32 micrometers, 38 micrometers, 45 micrometers, 53 micrometers, and 63 micrometers, the heat-expandable microspheres simultaneously satisfy the following conditions from (a) to (e), where the numerical ratio of heat-expandable microspheres containing at least one resin particle inside their shell ranging 0 to 10% is graded as A, the ratio over 10% to 30% as B, the ratio over 30% to 70% as C, the ratio over 70% to 90% as D, and the ratio over 90% to 100% as E:

(a) heat-expandable microspheres of particle sizes from 53 to 63 micrometers: being evaluated as any one of the grades A to D.

(b) heat-expandable microspheres of particle sizes from 45 to 53 micrometers: being evaluated as any one of the grades A to C.

(c) heat-expandable microspheres of particle sizes from 38 to 45 micrometers: being evaluated as A or C.

(d) heat-expandable microspheres of particle sizes from 32 to 38 micrometers: being evaluated as A.

(e) heat-expandable microspheres of particle sizes from 25 to 32 micrometers: being evaluated as A.

The heat-expandable microspheres mentioned above should preferably have a maximum expansion ratio of 70 times or more.

ADVANTAGEOUS EFFECTS

The method of producing the heat-expandable microspheres of the present invention minimizes resin particles being contained (generated) or existing inside the shell of microspheres and makes the shell less apt to become thinner than its theoretical value so as to efficiently produce heat-expandable microspheres having excellent heat-expandability.

The heat-expandable microspheres of the present invention have a shell less apt to become thinner than its theoretical value, and have high expansion ratio. In addition, the heat-expandable microspheres exhibit excellent expanding performance when they are heated and expanded, owing to their shell which is not thin, and the resultant heat-expanded microspheres have low true specific gravity suitable for lightening application.

Figure 1:
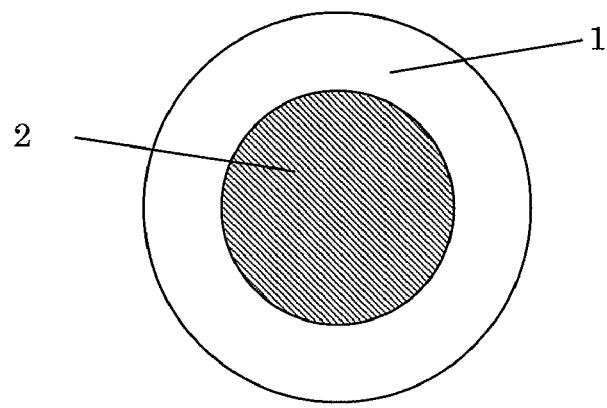
[FIG. 1] Diagram illustrating a preferable example of heat-expandable microcapsule.

[FIG.] 2 Diagram illustrating an example of heat-expandable microcapsule containing resin particles inside the shell.

EXPLANATION OF REFERENCES

1: Shell comprising thermoplastic resin
2: Blowing agent
3: Resin particle comprising thermoplastic resin

DETAILED DESCRIPTION OF THE INVENTION

The present invention is described in detail as in the following.

[Production Method for Heat-Expandable Microspheres]

A non-fluorine blowing agent (hereinafter sometimes referred to as a blowing agent) is not specifically restricted so far as it is a substance having a boiling point not higher than the softening point of the thermoplastic resin. However, a $C_{2-10}$ fluoride having an ether structure and containing no chlorine and bromine atoms is excluded from the blowing agent used in the present invention.

The blowing agent includes, for example, $C_{1-12}$ hydrocarbons and their halogen compounds, tetraalkyl silane, and compounds which thermally decompose to generate gas, though the blowing agent is not restricted within the category. One of those blowing agents or a mixture of at least two of them may be used.

The examples of the $C_{1-12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methyl pentane, 2,2-dimethyl butane, and petroleum ether. Any of these hydrocarbons having a linear, branched or all-cyclic structure are applicable, and aliphatic hydrocarbons are preferable.

The examples of the halogen compounds of $C_{1-12}$ hydrocarbons are methyl chloride, methylene chloride, chloroform, and carbon tetrachloride.

The examples of the tetraalkyl silane are silanes having $C_{1-5}$ alkyl groups, such as tetramethyl silane, trimethylethyl silane, trimethylisopropyl silane, and trimethyl-n-propyl silane.

The examples of the compounds which thermally decompose to generate gas are azodicarbonamide, N,N'-dinitropentamethylene tetramine, and 4,4'-oxybis (benzenesulfonyl hydrazide).

The fluorine compounds which are excluded from the blowing agent of the present invention are, for example, hydrofluoroethers, such as $C_3H_2F_7OCF_2H$, $C_3HF_6OCH_3$, $C_2HF_4OC_2H_2F_3$, $C_2H_2F_{30}C_2H_2F_3$, $C_4HF_8OCH_3$, $C_3H_2F_5OC_2H_3F_2$, $C_3HF_6OC_2H_2F_3$, $C_3H_3F_4OCHF_2$, $C_3HF_6OC_3H_2F_5$, $C_4H_3F_6OCHF_2$, $C_3H_3F_4OC_2HF_4$, $C_3HF_6OC_3H_3F_4$, $C_3F_7OCH_3$, $C_4F_9OCH_3$, $C_4F_9OC_2H_5$, and $C_7F_{15}OC_2H_5$.

The polymerizable component are polymerized in the presence of a polymerization initiator to be converted into thermoplastic resin which constitutes the shell of heat-expandable microspheres. The polymerizable component essentially comprises a monomer component and optionally contains a cross-linking agent.

The monomer component means those usually called (radically) polymerizable monomers, and includes, but not specifically restricted, for example, nitrile monomers such as acrylonitrile, methacrylonitrile, alpha-chloracrylonitrile, alpha-ethoxyacrylonitrile, and fumaronitrile; monomers having a carboxyl group, such as acrylic acid, methacrylic acid, itaconic acid, maleic acid, fumaric acid, and citraconic acid; halogenated vinyls such as vinyl chloride, vinylidene chloride, vinyl bromide, and vinyl fluoride; vinylester monomers such as vinyl acetate, vinyl propionate, and vinyl butyrate; (meth)acrylate monomers, such as methyl (meth)acrylate, ethyl (meth)acrylate, n-butyl (meth)acrylate, isobutyl (meth)acrylate, t-butyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobornyl (meth)acrylate, cyclohexyl (meth)acrylate, benzyl (meth)acrylate, beta-carboxyethyl acrylate, 2-hydroxyethyl (meth)acrylate, and 2-hydroxypropyl (meth)acrylate; styrene monomers, such as styrene, alpha-methyl styrene, and chlorostyrene; acryl amide monomers, such as acryl amide, substituted acryl amide, methacrylic amide, and substituted methacrylic amide; maleimide monomers, such as N-phenyl maleimide, N-(2-chlorophenyl) maleimide, N-cyclohexyl maleimide, and N-lauryl maleimide; styrene monomers, such as styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, n-methoxystyrene, p-phenyl styrene, p-chlorostyrene, and 3,4-dichlorostyrene; ethylenic unsaturated monoolefin monomers, such as ethylene, propylene, butylene, and isobutylene; vinyl ether monomers, such as vinyl methylether, vinyl ethylether, and vinyl isobutylether; vinyl ketone monomers, such as vinyl methylketone, vinyl hexylketone, and methyl isopropenylketone; N-vinyl monomers such as N-vinyl pyrrole, N-vinyl carbazole, N-vinyl indole, and N-vinylpyrolidone; and vinylnaphthalene salts. Part of or all of the carboxyl groups in the monomers having a carboxyl group may be neutralized in polymerization. The term, (meth) acryl, means acryl or methacryl.

One of or a mixture of at least two of those radically polymerizable monomers may be used. Above all a polymerizable component containing at least one radical polymerizable monomer selected from the group consisting of nitrile monomers, (meth)acrylate monomers, monomers having a carboxyl group, styrene monomers, vinyl acetate, acryl amide monomers, and vinylidene chloride is preferable.

A polymerizable component essentially comprising monomers having a carboxyl group is preferable because such component attains remarkable effect of the present invention. The weight ratio of the monomers containing a carboxyl group to the monomer component should preferably be not lower than 5 weight percent, more preferably not lower than 10 weight percent, further more preferably not lower than 15 weight percent, and most preferably not lower than 20 weight percent.

A polymerizable component essentially comprising nitrile monomers is preferable because such component improves the heat resistance of resultant microspheres. The weight ratio of the nitrile monomers to the monomer component should preferably be not lower than 20 weight percent, more preferably not lower than 25 weight percent, further preferably not lower than 30 weight percent, further more preferably not lower than 35 weight percent, and most preferably not lower than 40 weight percent.

A polymerizable component essentially comprising both of monomers having a carboxyl group and nitrile monomers is preferable because such component attains remarkable effect of the present invention and further improves the heat resistance of heat-expandable microspheres.

In this case, the weight ratio of the nitrile monomers to the monomer component should preferably ranges from 20 to 95 weight percent, more preferably from 25 to 90 weight percent, further preferably from 30 to 85 weight percent, further more preferably from 35 to 80 weight percent, and most preferably from 40 to 60 weight percent. The weight ratio of the monomers having a carboxyl group to the monomer component should preferably ranges from 5 to 80 weight percent, more preferably from 10 to 75 weight percent, further preferably from 15 to 70 weight percent, further more preferably from 20 to 65 weight percent, and most preferably from 40 to 60 weight percent.

It is preferable that a monomer component essentially comprising monomers having a carboxyl group should not substantially contain a monomer reactive with the carboxyl group in the monomers having a carboxyl group. Such monomers reactive with a carboxyl group include, for example, N-methylol (meth)acrylamide, N,N-dimethyl aminoethyl (meth)acrylate, N,N-dimethyl aminopropyl (meth)acrylate, magnesium mono(meth)acrylate, zinc mono(meth)acrylate, vinyl glycidyl ether, propenyl glycidyl ether, glycidyl (meth) acrylate, 2-hydroxyethyl (meth)acrylate, 2-hydroxypropyl (meth)acrylate, 2-hydroxybutyl (meth)acrylate, and 2-hydroxy-3-phenoxypropyl (meth)acrylate. The weight ratio of the monomers reactive with the carboxyl group in the monomers having a carboxyl group to the monomer component should preferably not higher than 5 weight percent, more preferably not higher than 3 weight percent, further preferably not higher than 1 weight percent, and most preferably 0 weight percent.

The polymerizable component may contain a polymerizable monomer having at least two polymerizable double bonds (a cross-linking agent), in addition to the monomer component mentioned above. Polymerization with a cross-linking agent controls the loss of the retention of a blowing agent encapsulated in microspheres after heat-expansion (internal retention) so as to effectively heat-expand the microspheres.

The cross-linking agent is not specifically restricted, and it includes aromatic divinyl compounds, such as divinyl benzene and divinyl naphthalene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or at least two of those cross-linking agents are applicable.

In the above description, the series of the compounds described as "PEG (***) dimethacrylate" are polyethylene glycol di(meth)acrylate, wherein the average molecular weight of their polyethylene glycol moieties is represented by the number in the parentheses.

The amount of the cross-linking agents is not specifically restricted, and the preferable amount should range from 0.01 to 5 parts by weight to 100 parts by weight of the monomer component, more preferably from 0.05 to 3 parts by weight, further preferably from 0.1 to 2.5 parts by weight, and most preferably from 0.3 to 2.0 parts by weight, considering the degree of cross-linking, the internal retention of a blowing agent encapsulated in the shell of microspheres, and the heat resistance and heat-expanding performance of the microspheres.

The thermoplastic resin constituting the shell of the heat-expandable microspheres of the present invention is obtained by polymerizing a polymerizable component in the presence of a polymerization initiator containing a peroxydicarbonate.

Polymerization in the presence of a polymerization initiator containing a peroxydicarbonate controls the existence of resin particles inside the shell of microspheres, makes the shell thickness less apt to become thinner than its theoretical value, and leads to high expansion ratio of resultant heat-expandable microspheres.

The peroxydicarbonate is not specifically restricted, and the compound represented by the following general formula (I) is one of the examples:

$$R^1\text{—OCO—O—O—COOR}^2 \quad (1)$$

where $R^1$ and $R^2$ are $C_{1\text{-}12}$ organic groups, and may be identical with or different from each other.

$R^1$ and $R^2$ include, for example, ethyl group, n-propyl group, isopropyl group, n-butyl group, isobutyl group, sec-butyl group, 4-t-butyl cyclohexyl group, 2-ethoxyethyl group, 3-methoxybutyl group, 2-ethylhexyl group, 2-octyl group, cyclohexyl group, and benzyl group.

The peroxydicarbonate includes, for example, diethyl peroxydicarbonate, di-n-propyl peroxydicarbonate, di-isopropyl peroxydicarbonate, bis(4-t-butylcyclohexyl) peroxydicarbonate, di-2-ethoxyethyl peroxydicarbonate, di-3-methoxybutyl peroxydicarbonate, di-sec-butyl peroxydicarbonate, di-2-ethylhexyl peroxydicarbonate, di-2-octyl peroxydicarbonate, dicyclohexyl peroxydicarbonate, and dibenzyl peroxydicarbonate. At least one selected from the group consisting of those is preferable.

At least one selected from the group consisting of di-isopropyl peroxydicarbonate, bis(4-t-butylcyclohexyl) peroxydicarbonate, di-sec-butyl peroxydicarbonate, and di-2-ethylhexyl peroxydicarbonate is more preferable, and at least one selected from the group consisting di-sec-butyl peroxydicarbonate and di-2-ethylhexyl peroxydicarbonate is further more preferable, considering the availability of peroxydicarbonates and their effect, such as the (co)polymerizability of the polymerizable component and the randomization of the structure of the thermoplastic resin constituting the shell of microspheres.

The polymerization initiator may contain known initiators other than peroxydicarbonate. The known polymerization initiators include, for example, peroxides, such as t-butyl peroxyisobutylate, t-butyl peroxy-2-ethylhexanoate, t-hexyl peroxy-2-ethylhexanoate, 2,5-dimethyl-2,5-bis(2-ethylhexanoyl peroxy) hexane, 1,1,3,3-tetramethylbutyl peroxy-2-ethylhexanoate, t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, t-butyl peroxy-3,5,5-trimethylhexanoate, octanoyl peroxide, lauroyl peroxide, stearyl peroxide, succinic acid peroxide, and benzoyl peroxide; and azo compounds, such as 2,2'-azobis (4-methoxy-2,4-dimethyl valeronitrile), 2,2'-azobis isobutyronitrile, 2,2'-azobis (2,4-dimethyl valeronitrile), 2,2'-azobis (2-methyl propionate), and 2,2'-azobis (2-methyl butyronitrile). Preferable known polymerization initiators are oil-soluble polymerization initiators which are soluble in radically polymerizable monomers.

The weight ratio of the polymerization initiators is not specifically restricted, and the preferable weight ratio ranges from 0.3 to 8.0 parts by weight to 100 parts by weight of the monomer component, more preferably from 0.5 to 7.5 parts by weight, and most preferably from 0.8 to 7.0 parts by weight.

When a polymerization initiator containing of both a peroxydicarbonate and a known polymerization initiator, higher ratio of the peroxydicarbonate in the polymerization initiator brings more effect. The ratio of the peroxydicarbonate in the polymerization initiator should preferably not lower than 60 weight percent, more preferably not lower than 70 weight percent, further preferably not lower than 80 weight percent, further more preferably not lower than 90 weight percent, and most preferably not lower than 100 weight percent.

The production method of the present invention produces heat-expandable microspheres, which comprise a shell of thermoplastic resin and a blowing agent (except fluorine-containing blowing agents, such as $C_{2\text{-}10}$ fluorides having ether structure and containing no chlorine and bromine atoms) encapsulated therein having a boiling point not lower than the softening point of the thermoplastic resin. At first, an oily mixture containing a polymerizable component, a blowing agent, and a polymerization initiator is dispersed in an aqueous dispersing medium, and then the polymerizable component in the oily mixture is suspension-polymerized.

In this production method, the suspension-polymerization should preferably be carried out in an aqueous dispersing medium containing a proper dispersion stabilizer and the like.

The examples of the dispersion stabilizers in aqueous dispersing medium are colloidal silica, colloidal calcium carbonate, magnesium hydroxide, calcium phosphate, aluminum hydroxide, ferric hydroxide, calcium sulfate, sodium sulfate, calcium oxalate, calcium carbonate, barium carbonate, magnesium carbonate, and alumina sol. The preferable ratio of the dispersion stabilizer ranges from 0.1 to 20 weight percent of the monomer component. In addition, dispersion-stabilizing auxiliaries such as polymer-type dispersion-stabilizing auxiliaries including condensates of diethanol amine and aliphatic dicarboxylic acid, gelatine, polyvinylpyrolidone, methyl cellulose, polyethylene oxide, and polyvinyl alcohol; and emulsifiers including cationic surfactants such as alkyltrimethyl ammonium chloride and dialkyldimethyl ammonium chloride, anionic surfactants such as sodium alkyl sulfate, and amphoteric surfactants such as alkyldimethyl aminoacetic acid betaine and alkyldihydroxyethyl aminoacetic acid betaine may be used. The preferable ratio of the dispersion-stabilizing auxiliaries ranges from 0.05 to 2 parts by weight to 100 parts by weight of the monomer component.

An aqueous dispersing medium containing a dispersion stabilizer is prepared by mixing a dispersion stabilizer and dispersion stabilizing auxiliary in water (for example, deionized water). The pH of the aqueous dispersing medium for polymerization is properly determined according to the variants of a dispersion stabilizer and dispersion stabilizing auxiliary to be used. The aqueous dispersing medium should preferably contain water-soluble reductant, which controls the generation of aggregated microspheres during polymerization. The examples of the water-soluble reductants are nitrites of alkali metals, such as sodium nitrite and potassium nitrite, stannous chloride, stannic chloride, ferrous chloride, ferric chloride, ferrous sulfate, water-soluble ascorbic acids, and their derivatives. Above all nitrites of alkali metals are preferable for their stability in water. The ratio of the reductants should preferably range from 0.0001 to 1 parts by weight, and more preferably from 0.0003 to 0.1 parts by weight to 100 parts by weight of the monomer component.

For dispersing and emulsifying the oily mixture into certain particle sizes in the aqueous dispersing medium, generally known dispersion techniques such as agitation with a Homo-mixer (for example, those manufactured by Tokushu Kika Kogyou) and a Homo-disper (for example, those manufactured by Tokushu Kika Kogyou), dispersion with a static dispersing equipment such as a Static mixer (for example, those manufactured by Noritake Engineering Co., Ltd.), membrane emulsification technique, and ultrasonic dispersion may be employed.

Figure 2:
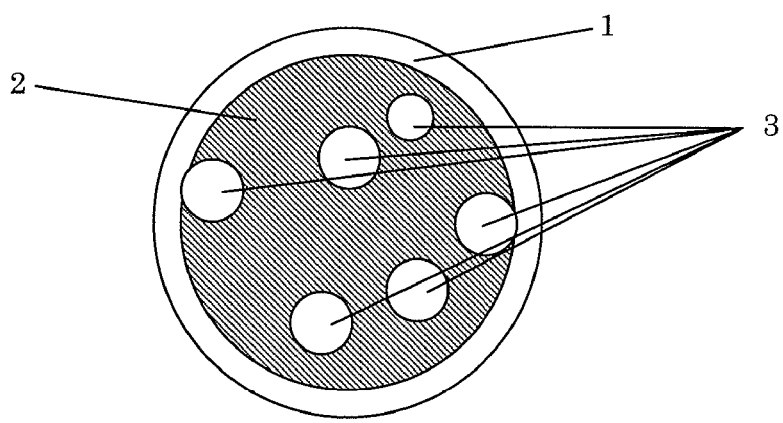

One of the examples of the methods for dispersing and emulsifying the oily mixture is a method with a continuous high-speed rotational and accelerated shear agitation-disperser disclosed in JP-A-2000-191817. A preferable method is the one with a Clearmix, wherein a homogenizer constituted of a conical or truncated conical screen which has liquid-feeding opening of vertical slits, and of a conical or truncated conical rotor with blades which is fixed inside the screen with some clearance is used, and a hydrophobic substance and an aqueous dispersing medium are fed from the rotor side to be passed through the clearance between the rotor and screen and through the liquid-feeding opening of the screen with high speed agitation of the rotor so as to disperse and emulsify the oily mixture in the aqueous dispersing medium (refer to the paragraphs 5 to 13 and the FIGS. 1 to 4 of JP-A-2004-959).

The polymerization temperature may be freely settled according to the variant of a polymerization initiator, and should preferably be controlled within the range from 40 to 100 deg.C., more preferably from 45 to 90 deg.C., and further preferably from 50 to 85 deg.C. Initial polymerization pressure should preferably be controlled within the range from 0 to 5.0 MPa, more preferably from 0.1 to 3.0 MPa, and further preferably from 0.2 to 2.0 MPa in gauge pressure.

The method of producing heat-expandable microspheres of the present invention may further contain a step of adhering a particulate filler on the outer surface of the shell of microspheres. A particulate filler adhered onto the outer surface of the shell of microspheres contributes to improved dispersibility and flow ability of microspheres in use.

The particulate filler may be either an organic or an inorganic filler, and the variant and amount of the particulate filler are selected according to the application of microspheres.

The organic particulate filler includes, for example, metal soaps, such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacrylamide, polyimide, nylon, methyl polymethacrylate, polyethylene, and polytetrafluoroethylene.

The examples of inorganic fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, glass beads, and crystal beads.

One of or at least two of the particulate fillers may be employed.

The average particle size of the particulate fillers is preferably not greater than one tenth of the average particle size of heat-expandable microspheres before adhering the particulate fillers. The average particle size mentioned here means the average particle size of primary particles.

The amount of a particulate filler adhered onto the heat-expandable microspheres is not specifically restricted, and should preferably range from 0.1 to 95 parts by weight, more preferably from 0.5 to 60 parts by weight, further more preferably from 5 to 50 parts by weight, and most preferably from 8 to 30 parts by weight to 100 parts by weight of heat-expandable microspheres before adhering the filler, for optimizing the function of the particulate filler and properly controlling the true specific gravity of heat-expandable microspheres.

A particulate filler is adhered onto heat-expandable microspheres by mixing heat-expandable microspheres and a particulate filler. The mixing process is not specifically restricted, and a device of a very simple mechanism, such as a vessel and paddle blades, is employable. Ordinary powder mixers for shaking or agitating powders are also applicable. The powder mixers include those which can shake and agitate, or agitate powders, such as ribbon-type mixers and vertical screw mixers. Highly efficient multi-functional powder mixers recently manufactured by combining several agitation devices, such as Super Mixer (manufactured by Kawata MFG Co., Ltd.), High-Speed Mixer (manufactured by Fukae Co., Ltd.), New-Gram Machine (manufactured by Seishin Enterprise Co., Ltd.), and SV mixer (manufactured by KOBELCO Eco-Solutions Co., Ltd.) may be used.

[Heat-Expandable Microspheres]

The heat-expandable microspheres of the present invention comprise a shell of thermoplastic resin and a blowing agent encapsulated therein having a boiling point not higher than the softening point of the thermoplastic resin, and exhibit heat-expandability in whole (or expands under heating in whole). The heat-expandable microspheres should preferably have the following various properties.

The average particle size of the heat-expandable microspheres may be freely designed according to their application, and therefore is not specifically restricted. An average particle size ranges normally from 1 to 100 micrometers, preferably from 5 to 80 micrometers, more preferably from 10 to 60 micrometers, further more preferably from 20 to 60 micrometers, and most preferably from 25 to 60 micrometers.

The particle size of the heat-expandable microspheres usually distributes in a certain range. The effects of controlling the amount of thermoplastic resin particles existing inside the shell of heat-expandable microspheres, making the shell less apt to become thinner than its theoretical value, and increasing the expansion ratio of heat-expandable microspheres are found rather remarkably in heat-expandable microspheres having comparatively large particle sizes (for example, not smaller than 25 micrometers, preferably not smaller than 32 micrometers, more preferably not smaller than 38 micrometers, further preferably not smaller than 45 micrometers, further more preferably not smaller than 53 micrometers, and most preferably not smaller than 63 micrometers).

The resin particles mentioned in the present invention are defined as particles of thermoplastic resin, which exist inside the shell of heat-expandable microspheres and have a particle size not smaller than one tenth of the particle size of the heat-expandable microspheres. The shape of the resin particles is not specifically restricted, and is usually almost spherical. The resin particles may also be formed into the aggregation or bonding of those particles, or indefinite form. The resin particles may sometimes adhere onto the inner surface of the shell of heat-expandable microspheres, resembling like lumps.

The coefficient of variation, CV, of the particle size distribution of the heat-expandable microspheres is not specifically restricted, and it should preferably be 35 percent or less, more preferably 30 percent or less, and further more preferably 25 percent or less. The coefficient of variation, CV, is calculated by the following expressions (1) and (2):

$$CV = (s/ <x>) \times 100 (\text{percent}) \quad (1)$$

$$s = \left\{ \sum_{i=1}^{n} (xi - <x>)^2 / (n-1) \right\}^{1/2} \quad (2)$$

where s is a standard deviation of particle size, <x> is an average particle size, xi is a particle size of an i-th particle, and n is the number of particles.

The retention of a non-fluorine blowing agent in heat-expandable microspheres, G, should range preferably from 5 to 30 weight percent, more preferably from 8 to 28 weight percent, and further preferably from 10 to 25 weight percent.

For confirming that the shell of the heat-expandable microspheres is less apt to become thinner than its theoretical value, the percentage of the average membrane thickness to the average particle size, R, is calculated as follows for heat-expandable microspheres having particle sizes within a certain range.

At first, heat-expandable microspheres having particle sizes within the range of 20+/−2 micrometers are selected from heat-expandable microspheres having an average particle size ranging from 1 to 100 micrometers (preferably from 5 to 80 micrometers, more preferably from 10 to 60 micrometers, further more preferably from 20 to 60 micrometers, and most preferably from 25 to 60 micrometers), and their average membrane thickness and average particle size are determined. Then heat-expandable microspheres having particle sizes within each range of 30+/−3 micrometers, 35+/−4 micrometers, 40+/−4 micrometers, 50+/−5 micrometers, and 60 +/−6 micrometers are selected in the same manner, and their average membrane thickness and average particle size are determined. Then the percentage of average membrane thickness to average particle size, R, of the heat-expandable microspheres having particle sizes within each range are calculated. The average membrane thickness mentioned here is the same as average shell thickness.

Then the percentage of the average membrane thickness of the whole of heat-expandable microspheres (theoretical average membrane thickness, the same as the theoretical value of membrane thickness) to the average particle size of the whole of the heat-expandable microspheres (so called the average particle size of heat-expandable microspheres), K, is calculated.

The theoretical average membrane thickness means an average membrane thickness calculated from the average particle size of the whole of heat-expandable microspheres, in which no resin particles exist inside their shell and thermoplastic resin only forms the shell; and is calculated by the expression shown in the Examples.

The above-mentioned R for each particle size range is divided by K and calculated into percentage, which is the percentage of R to K for each particle size range. Greater percentage of R to K indicates less tendency of the actual membrane thickness to become thinner than the theoretical average membrane thickness which is calculated from the average particle size of the whole of heat-expandable microspheres. It is preferable that the percentage of R to K for each particle size range satisfies at least two of the following conditions from (1) to (6) (preferably at least three, more preferably at least four, further more preferably at least five, and most preferably all of (1) to (6)). It is further preferable that the retention, G, ranges from 5% to 30%.

(1) the percentage of R/K for the particle size range of 20+/−2 micrometers: 92% or more (preferably 94% or more, more preferably 96% or more, further preferably 98% or more, and most preferably 100% or more)

(2) the percentage of R/K for the particle size range of 30+/−3 micrometers: 94% or more (preferably 95% or more, more preferably 96% or more, further preferably 97% or more, and most preferably 98% or more)

(3) the percentage of R/K for the particle size range of 35+/−4 micrometers: 88% or more (preferably 90% or more, more preferably 92% or more, further preferably 94% or more, and most preferably 96% or more)

(4) the percentage of R/K for the particle size range of 40+/−4 micrometers: 80% or more (preferably 82% or more, more preferably 84% or more, further preferably 86% or more, and most preferably 88% or more)

(5) the percentage of R/K for the particle size range of 50+/−5 micrometers: 65% or more (preferably 68% or more, more preferably 71% or more, further preferably 74% or more, and most preferably 77% or more)

(6) the percentage of R/K for the particle size range of 60+/−6 micrometers: 55% or more (preferably 57% or more, more preferably 59% or more, further preferably 61% or more, and most preferably 63% or more)

In the above description, it is preferable that the conditions (6) and (5) constitute "at least two" conditions to be satisfied, and that the conditions (6), (5) and (4) constitute "at least three" conditions to be satisfied. It is also preferable that the conditions (6), (5), (4) and (3) constitute "at least four" conditions to be satisfied, and that the conditions (6), (5), (4), (3) and (2) constitute "at least five" conditions to be satisfied.

When the percentage of R to K of resultant heat-expandable microspheres satisfies the conditions mentioned above, the shell of the heat-expandable microspheres is less apt to become thinner than its theoretical value, the existence of resin particles inside the shell is controlled, and the heat-expandable microspheres have high expansion ratio. The effect is remarkable for microspheres of large particle sizes.

The R and K are specifically measured and calculated by the methods described in the Examples.

The heat-expandable microspheres should preferably contain lower ratio of heat-expandable microspheres containing at least one resin particle inside their shell (sometimes referred to as multinucleus microspheres). For checking the ratio of the multinucleus microspheres contained in heat-expandable microspheres having an average particle size ranging from 1 to 100 micrometers (preferably from 5 to 80 micrometers, more preferably from 10 to 60 micrometers, further more preferably from 20 to 60 micrometers, and most preferably from 25 to 60 micrometers), a method for evaluating the ratio of multinucleus microspheres in each fraction of microspheres sorted with several sieves of different opening (opening of 25 micrometers, 32 micrometers, 38 micrometers, 45 micrometers, 53 micrometers, and 63 micrometers), for example the method explained in detail in the Examples, is available.

When the standard for evaluating the numerical ratio of multinucleus microspheres contained in each fraction of sorted heat-expandable microspheres in this method is defined as "A" for the ratio of multinucleus microspheres from 0 to 10%, "B" for the ratio over 10% to 30%, "C" for the ratio over 30% to 70%, "D" for the ratio over 70% to 90%, and "E" for the ratio over 90% to 100%, the heat-expandable microspheres should preferably satisfy the following conditions from (a) to (e) simultaneously:

(a) heat-expandable microspheres of particle sizes ranging from 53 to 63 micrometers (in other words, those which pass through the sieve of 63 micrometers opening and do not pass through the sieve of 53 micrometers opening): being evaluated as any one of A to D (preferably any one of A to C, more preferably A or B, and further more preferably A)

(b) heat-expandable microspheres of particle sizes ranging from 45 to 53 micrometers (in other words, those which pass through the sieve of 53 micrometers opening and do not pass through the sieve of 45 micrometers opening): being evaluated as any one of A to C (preferably A or B, and more preferably A)

(c) heat-expandable microspheres of particle sizes ranging from 38 to 45 micrometers (in other words, those which pass through the sieve of 45 micrometers opening and do not pass through the sieve of 38 micrometers opening): being evaluated as A or B (preferably A)

(d) heat-expandable microspheres of particle sizes ranging from 32 to 38 micrometers (in other words, those which pass through the sieve of 38 micrometers opening and do not pass through the sieve of 32 micrometers opening): being evaluated as A (e) heat-expandable microspheres of particle sizes ranging from 25 to 32 micrometers (in other words, those which pass through the sieve of 32 micrometers opening and do not pass through the sieve of 25 micrometers opening): being evaluated as A.

The evaluation of the numerical ratio of multinucleus microspheres in the fractions of heat-expandable microspheres sorted as mentioned above is specifically carried out in the method described in Example.

In the preferable cases mentioned above, the ratio of heat-expandable microspheres containing resin particles is small, and most of thermoplastic resin constitutes their shell as intended. Thus the shell of resultant heat-expandable microspheres is less apt to become thinner than its theoretical value, and the microspheres have high expansion ratio. The effect is remarkable for microspheres of large particle sizes.

The heat-expandable microspheres of the present invention have an expansion initiating temperature usually not lower than 75 deg.C., preferably not lower than 95 deg.C., more preferably not lower than 110 deg.C., further preferably not lower than 115 deg.C., furthermore preferably not lower than 135 deg.C., and most preferably not lower than 155 deg.C. Higher expansion initiating temperature is more preferable because the effect of the present invention appears more remarkably.

A physical property which represents the expanding performance of heat-expandable microspheres is expansion ratio. In the present invention, the expansion ratio of heat-expandable microspheres which have expanded to their maximum is usually not lower than 70 times, preferably not lower than 80 times, more preferably not lower than 90 times, further preferably not lower than 100 times, and most preferably not lower than 120 times. Heat-expandable microspheres with a greater expansion ratio are more economical for reduced weight applications, because such microspheres achieve the reduced weight with smaller amount.

Heat-expanded microspheres are produced by heating and expanding heat-expandable microspheres. The method of producing heat-expanded microspheres is not specifically restricted, and either dry heating-expanding method or wet heating-expanding method is employable.

The method of producing the above-mentioned heat-expandable microspheres of the present invention is not specifically restricted, and a preferable method is the production method mentioned above.

EXAMPLE

The present invention is described specifically with the following examples, though the present invention is not restricted within the scope of those examples.

(Determination Methods and Definition)

[Determination of Average Particle Size and Particle Size Distribution]

A laser diffraction particle size analyzer (HEROS & RODOS, manufactured by SYMPATEC) was employed as the device for the determination. Microspheres were analyzed in a dry system with a dry dispersion unit, where the dispersion pressure was controlled at 5.0 bar and the degree of vacuum was controlled at 5.0 mbar. The D50 value was determined as an average particle size.

[Determination of True Specific Gravity of Heat-Expandable Microspheres]

The true specific gravity, $d_c$, of microspheres was determined with the liquid substitution method (Archimedean method) with isopropyl alcohol in an atmosphere at 25 degree.C. and 50% RH (relative humidity).

Specifically, an empty 100-cc measuring flask was dried and weighed ($WB_1$). Isopropyl alcohol was poured into the weighed measuring flask accurately to form meniscus, and the measuring flask filled with isopropyl alcohol was weighed ($WB_2$).

Then the 100-cc measuring flask was emptied, dried, and weighed ($WS_1$). About 50 cc of heat-expandable microspheres were filled into the weighed measuring flask, and the measuring flask filled with the heat-expandable microspheres was weighed ($WS_2$). Then isopropyl alcohol was poured into the measuring flask filled with the heat-expandable microspheres accurately to form meniscus without taking bubbles into the isopropyl alcohol, and the flask filled with the microspheres and isopropyl alcohol was weighed ($WS_3$). The values, $WB_1$, $WB_2$, $WS_1$, $WS_2$, and $WS_3$, were introduced into the following expression to calculate the true specific gravity (de) of the heat-expandable microspheres.

$$\text{True specific gravity, } d_c = \{(WS_2-WS_1)\times(WB_2-WB_1)/100\}/\{(WB_2-WB_1)-(WS_3-WS_2)\}$$

The true specific gravity of heat-expanded microspheres was calculated in the same manner as described above.

[Determination of True Specific Gravity of Thermoplastic Resin Constituting the Shell of Microspheres]

For determining the true specific gravity, $d_p$, of shell resin (thermoplastic resin constituting the shell of microspheres), 30 g of heat-expandable microspheres were dispersed in 900 ml of acetonitrile, then treated with an ultrasonic disperser for 30 minutes, left at room temperature for 3 hours, and dried at 120 deg.C. for 5 hours. The resultant dry microspheres were further dried under reduced pressure with a vacuum pump for 2 hours. Then no change in the mass of the dried microspheres was confirmed, and the true specific gravity of the shell resin was determined in the same manner as in the determination method of the true specific gravity mentioned above.

[Determination of Moisture Content of Heat-Expandable Microspheres]

The moisture content was determined with a Karl Fischer moisture meter (MKA-510N, manufactured by Kyoto Electronics Manufacturing Co., Ltd.).

[Determination of the Retention of Blowing Agent Encapsulated in Heat-Expandable Microspheres]

In a stainless steel evaporating dish 15 mm deep and 80 mm in diameter, 1.0 g of heat-expandable microspheres was placed and weighed ($W_1$). Then 30 ml of acetonitrile was added to disperse the microspheres uniformly. After being left for 3 hours at room temperature, the microspheres were dried at 120 degree.C. for 2 hours, and the dry weight ($W_2$) was determined. The retention of encapsulated blowing agent was calculated by the following expression.

Retention (weight percent)=$(W_1-W_2)(g)/1.0\ (g)\times 100-$(moisture content) (weight percent)

(The Moisture Content in the Expression was Determined as Described Above.)

[Determination of Expansion Initiating Temperature and Maximum-Expanding Temperature]

Those properties were determined with DMA (DMA Q800, manufactured by TA Instruments). In an aluminum cup 4.8 mm deep and 6.0 mm in diameter (5.65 mm in inside diameter), 0.5 mg of heat-expandable microspheres were placed, and an aluminum lid 0.1 mm thick and 5.6 mm in diameter was placed on the cup to prepare a sample. The sample was subjected to a pressure of 0.01 N with a compression unit, and the height of the sample was measured. The sample was then heated at the temperature ranging from 20 to 300 degree.C. elevating at a rate of 10 degree.C./min, being subjected to the pressure of 0.01 N with the compression unit, and the vertical change of the position of the compression unit was determined. The temperature at which the compression unit started to change its position to the positive direction was determined as an expansion initiating temperature, and the temperature at which the compression unit indicated the greatest change was determined as the maximum-expanding temperature.

[Determination of True Specific Gravity of Microspheres Expanded to their Maximum]

A flat 12 cm long, 13 cm wide, and 9 cm high box was made of aluminium foil, and 1.0 g of heat-expandable microspheres were filled into uniform thickness. Then the heating of the microspheres was started at the expansion initiating temperature obtained in the measuring method mentioned above, and the heating temperature was raised by 5 deg.C. heating the microspheres for 1 minute at each temperature level. The true specific gravity of the expanded microspheres at each temperature level was determined in the same manner as in the determination method of true specific gravity mentioned above. The lowest true specific gravity among several results was determined as the true specific gravity of microspheres expanded to their maximum.

[Determination of Expansion Ratio of Microspheres Expanded to their Maximum]

The expansion ratio (times) of microspheres expanded to their maximum was calculated by introducing the true specific gravity of heat-expandable microspheres before expanding ($d_c$) and the true specific gravity of the microspheres expanded to their maximum ($d_{max}$), which were determined in the same manner as that for determining the true specific gravity mentioned above, in the following expression.

Expansion ratio (times)=$d_c/d_{max}$

[Evaluation of Ratio of Multinucleus Microspheres]

Heat-expandable microspheres were sorted into fractions according to their particle size range with a sonic classifier (Hand Sifter SW-20-AT, manufactured by Tsutsui Scientific Instrument Co., Ltd.), and heat-expandable microspheres having at least one resin particle inside their shell (multinucleus microspheres), which are contained in each fraction, were visually inspected as follows.

At first, plastic sieves with nylon mesh (JIS Test Sieve, 200 mm in diameter, with openings of 25 micrometers, 32 micrometers, 38 micrometers, 45 micrometers, 53 micrometers, and 63 micrometers) were prepared. Then a classifying device was fabricated by piling a receiving vessel, a sieve of 25 micrometer opening, a sieve of 32 micrometer opening, a sieve of 38 micrometer opening, a sieve of 45 micrometer opening, a sieve of 53 micrometer opening, and a sieve of 63 micrometer opening in the order from the bottom to the top, and by mounting a sound generator at the top.

Then 25 g of heat-expandable microspheres were weighed and placed on the sieve of 63 micrometer opening. Then the sound generator was started to fractionate the microspheres by controlling the sound wave frequency level at 50 Hz, 60 Hz, and then 50 Hz, each for 15 minutes. The sound wave frequency may be changed within the range from 50 to 300 Hz, and is not restricted at the above-mentioned levels, because optimum sound wave frequency varies depending on the number of piled sieves, opening of sieves, and the property of samples.

After the fractionation, the microspheres of each fraction were collected, and 1 part by weight of the sample of each fraction and 2 parts by weight of an epoxy resin (an epoxy adhesive: Araldite Rapid, supplied by Huntsman Advanced Materials Co., Ltd.) were mixed and cured at 20 to 25 deg.C. for 24 hours. Then the cured solid was sliced with a Microtome (Leica, RM2235). The cross section of the sliced solid was inspected through electron microscope (with 300-time magnification) to evaluate the ratio of multinucleus microspheres in each fraction. The evaluation was performed by randomly sampling 50 heat-expandable microspheres inspected through electron microscope, and counting the number of multinucleus microspheres among the sampled microspheres. The standard for evaluating the ratio of multinucleus microspheres was defined as A for 0 to 5 multinucleus microspheres (in other words, 0 to 10%), B for 6 to 15 (in other words, over 10 to 30%), C for 16 to 35 (in other words, over 30 to 70%), D for 36 to 45 (in other words, over 70 to 90%), and E for 46 to 50 (in other words, over 90 to 100%), and each fraction was evaluated.

[Determination of Particle Size and Membrane Thickness, and Calculation of R and K]

The cross section of heat-expandable microspheres was inspected through electron microscope in the same manner as described above, and their photomicrographs were taken. The magnification of the electron microscope was controlled to a level at which one microsphere fills the scope of a photomicrograph (90 mm long and 117 mm wide).

Ten heat-expandable microspheres were randomly sampled from those in the particle size range of 20+/−2 micrometers in the fraction which passed through the sieve of 25 micrometer opening, and photomicrographs of each microsphere were taken through electron microscope. The membrane thickness of each microsphere was measured at least four points on its shell, where the points were selected to have intervals as equal as possible. The average membrane thickness of the ten microspheres was calculated, and determined as the average membrane thickness of heat-expandable microspheres having particle sizes in the range of 20+/−2 micrometers. The average membrane thickness means the average of membrane thickness measured at least 40 points (in other words, at least 4 points of 10 microspheres). In addition, the average particle size of the ten microspheres was determined as the average particle size of heat-expandable microspheres having particle sizes in the range of 20+/−2 micrometers.

Then each ten heat-expandable microspheres were randomly sampled from those in the particle size range of 30+/−3 micrometers in the fraction between the sieve openings of 25 micrometer and 32 micrometer, those in the particle size range of 35+/−4 micrometers in the fraction between the sieve openings of 32 micrometer and 38 micrometer, those in the particle size range of 40+/−4 micrometers in the fraction between the sieve openings of 38 micrometer and 45 micrometer, those in the particle size range of 50+/−5 micrometers in the fraction between the sieve openings of 45 micrometer and 53 micrometer, and those in the particle size range of 60+/−6 micrometers in the fraction between the sieve openings of 53 micrometer and 63 micrometer. Then the average membrane thickness and average particle size of the heat-expandable microspheres in each of the particle size ranges of 30+/−3 micrometers, 35+/−4 micrometers, 40+/−4 micrometers, 50+/−5 micrometers, and 60+/−6 micrometers were determined in the same manner as mentioned above.

The percentage of average membrane thickness to average particle size, R (the percentage of the average membrane thickness of each ten heat-expandable microspheres to the average particle size of each ten heat-expandable microspheres), of each ten heat-expandable microspheres from each of the particle size ranges was calculated by the following expression.

$$R\ (\%)\ (\text{average membrane thickness (micrometer)})/\text{particle size (micrometer)})\times 100$$

Then the theoretical average membrane thickness of heat-expandable microspheres was calculated by the following expression in order to calculate the percentage of the theoretical average membrane thickness of the whole of heat-expandable microspheres to the average particle size of the whole of heat-expandable microspheres, K, in other words, the percentage of theoretical average membrane thickness to the average particle size of the whole of heat-expandable microspheres, K.

$$\text{Theoretical average membrane thickness} = <x>/2[1-\{1-d_c(1-G/100)/d_p\}^{1/3}]$$

where $<x>$ is the average particle size (micrometer) of the whole of heat-expandable microspheres, $d_c$ is the average true specific gravity (g/cc) of microspheres, $d_p$ is the average true specific gravity (g/cc) of thermoplastic resin constituting the shell of microspheres, and G is the retention (weight percent) of a non-fluorine blowing agent.

Following to that, the percentage of theoretical average membrane thickness to the average particle size of the whole of heat-expandable microspheres, K, was calculated by the following expression.

$$K\ (\%) = (\text{theoretical average membrane thickness})/<x>\times 100$$

where $<x>$ is the average particle size (micrometer) of the whole of heat-expandable microspheres.

The R in each of the particle size ranges determined as described above was divided by the K in each of the particle size ranges determined as described above, and the result was calculated into percentage to determine the percentage of R to K in each of the particle size ranges.

Example 1

An aqueous dispersing medium was prepared by adding 23 parts by weight of sodium chloride, 10 parts by weight of colloidal silica (20-percent concentration), 0.1 parts by weight of polyvinylpyrolidone, and 0.01 parts by weight of sodium nitrite to 200 parts by weight of deionized water, controlling the pH of the mixture at 2.4, and uniformly mixing the mixture with agitation.

An oily mixture was prepared by mixing the components according to the recipe in Table 1.

The aqueous dispersing medium and the oily mixture were mixed, and the mixed liquid was dispersed into a suspension with a disperser equipped with a compressive vessel (trade name: Clearmix CLM-0.8S, manufactured by M Technique Co., Ltd.), where four paddles were attached onto the rotor of the disperser to make 0-rad lead angle, a screen having twenty-four slits each being 2 mm wide was used, and the clearance between the rotor and screen was adjusted into 0.5 mm, and the dispersion was performed for 180 sec controlling the rotor speed at 16000 rpm. Then the suspension was transferred to a reactor, purged with nitrogen, and polymerized for 20 hours by controlling the initial reaction pressure at 0.5 MPa and the polymerization temperature at the levels shown in Table 1. After the polymerization, the polymerized product was filtered and dried. The average particle size, CV of particle size distribution, retention of a blowing agent, true specific gravity, expansion-initiating temperature, maximum-expanding temperature, true specific gravity of microspheres expanded to maximum, ratio of multinucleus microspheres in each fraction of fractionated microspheres (ratio of multinucleus microspheres), and the percentage of R to K in each particle size range of the resultant heat-expandable microspheres were determined. The result is shown in Table 1.

Examples 2 to 4

In Examples 2 to 4, heat-expandable microspheres were produced and evaluated in the same manner as in Example 1 except that the composition of oily mixture and reacting condition were changed as shown in Table 1. The results in Table 1 were obtained.

Comparative Example 1

In Comparative example 1, heat-expandable microspheres were produced and evaluated in the same manner as in Example 1 except that the composition of oily mixture and reacting condition were changed as shown in Table 1. The result in Table 1 was obtained.

Comparative Example 2

In Comparative example 2, heat-expandable microspheres were produced and evaluated in the same manner as in Example 1 except that (1) the composition of oily mixture and reacting condition were changed as shown in Table 1, (2) 10 parts by weight of colloidal silica (20-percent concentration) in the aqueous dispersing medium was increased to 20 parts by weight, and (3) the mixture of the aqueous dispersing medium and oily mixture was dispersed into suspension with a T.K. Homo-mixer M (manufactured by Tokushu Kika Kogyou) at 6000 rpm and for 180 sec. The result in Table 1 was obtained.

TABLE 1

|  |  | Ex. 1 | Ex. 2 | Ex. 3 | Ex. 4 | Comp. ex. 1 | Comp. ex. 2 |
| --- | --- | --- | --- | --- | --- | --- | --- |
| Monomer component | AN (parts by weight) | 30 | 30 | 30 | 30 | 30 | 30 |
|  | MAN (parts by weight) | 25 | 25 | 25 | 25 | 25 | 25 |
|  | MAA (parts by weight) | 45 | 45 | 45 | 45 | 45 | 45 |

TABLE 1-continued

|  |  | Ex. 1 | Ex. 2 | Ex. 3 | Ex. 4 | Comp. ex. 1 | Comp. ex. 2 |
|---|---|---|---|---|---|---|---|
| Cross-linking agent | Cross-linking agent A (parts by weight) | 0.5 | 0.5 | 0.5 | 0.5 | | |
|  | Cross-linking agent B (parts by weight) | | | | | 0.5 | 0.5 |
| Blowing agent | Blowing agent A (parts by weight) | 19 | 19 | 19 | 19 | 19 | 19 |
| Initiator | Initiator A (parts by weight) | 2.3 | | | | | |
|  | Initiator B (parts by weight) | | 1.3 | | | | |
|  | Initiator C (parts by weight) | | | 2.5 | | | |
|  | Initiator D (parts by weight) | | | | 2.0 | | |
|  | Initiator E (parts by weight) | | | | | 1.3 | 1.3 |
| Polymerization temperature (deg. C.) | | 50 | 50 | 50 | 50 | 60 | 60 |
| Average particle size (micrometer) | | 35 | 34 | 34 | 35 | 35 | 19 |
| CV (%) | | 25 | 24 | 23 | 24 | 25 | 47 |
| Retention of non-fluorine blowing agent (wt %) | | 14.3 | 14.4 | 14.4 | 14.7 | 14.5 | 14.3 |
| True specific gravity (g/cc) | | 1.10 | 1.10 | 1.10 | 1.10 | 1.10 | 1.10 |
| Expansion initiating temperature (deg. C.) | | 163 | 164 | 164 | 162 | 162 | 162 |
| Maximum-expanding temperature (deg. C.) | | 228 | 226 | 226 | 227 | 218 | 216 |
| True specific gravity of expanded microspheres to maximum (g/cc) | | 0.008 | 0.009 | 0.007 | 0.007 | 0.021 | 0.018 |
| Expansion ratio of expanded microspheres to maximum (times) | | 138 | 122 | 157 | 157 | 52 | 61 |
| True specific gravity of shell resin (g/cc) | | 1.18 | 1.18 | 1.18 | 1.18 | 1.18 | 1.18 |
| Evaluation of ratio of multinucleus microspheres | Fraction passing 25 micrometer opening | A | A | A | A | A | A |
|  | Fraction between 25 to 32 micrometer openings | A | A | A | A | B | B |
|  | Fraction between 32 to 38 micrometer openings | A | A | A | A | B | B |
|  | Fraction between 38 to 45 micrometer openings | B | B | B | B | C | C |
|  | Fraction between 45 to 53 micrometer openings | C | C | C | C | D | D |
|  | Fraction between 53 to 63 micrometer openings | C | C | C | C | E | E |
|  | K (%) | 20.7 | 20.6 | 20.6 | 20.5 | 20.6 | 20.7 |
| R/K (%) | Particle size: 20 +/− 2 micrometers | 109 | 109 | 107 | 112 | 104 | 104 |
|  | Particle size: 30 +/− 3 micrometers | 99.5 | 102 | 98.4 | 104 | 93.4 | 93.2 |
|  | Particle size: 35 +/− 4 micrometers | 96.6 | 98.4 | 96.9 | 101 | 87.4 | 85.5 |
|  | Particle size: 40 +/− 4 micrometers | 91.8 | 93.6 | 93.1 | 95.3 | 70.4 | 69.1 |
|  | Particle size: 50 +/− 5 micrometers | 83.6 | 84.3 | 83.4 | 86.5 | 61.7 | 60.9 |
|  | Particle size: 60 +/− 6 micrometers | 64.3 | 64.0 | 63.5 | 66.5 | 50.0 | 50.7 |

AN: acrylonitrile
MAN: methacrylonitrile
MAA: methacrylic acid
Cross-linking agent A: 1,6-hexanediol diacrylate
Cross-linking agent B: dipentaerythritol hexaacrylate
Blowing agent A: isopentane
Initiator A: di-2-ethylhexyl peroxydicarbonate (PEROYL OPP, 70% concentration)
Initiator B: diisopropyl peroxydicarbonate (PEROYL IPP, 50% concentration)
Initiator C: bis (4-t-butylcyclohexyl) peroxydicarbonate (PEROYL TCP, 90% concentration)
Initiator D: di-sec-butyl peroxydicarbonate (Lupasol 225 or S(BP), 50% concentration)
Initiator E: t-hexyl peroxypivalate (PERHEXYL PV, 70% concentration)

Table 1 shows that microspheres of greater particle size are usually apt to contain higher ratio of multinucleus microspheres and have thinner shell, though the microspheres of greater particle size in Examples 1 to 4 contain lower ratio of multinucleus microspheres than the microspheres in Comparative examples 1 and 2. In addition, the shells of the microspheres of greater particle size in Examples 1 to 4 are less apt to become thinner than their theoretical value than the shells of the microspheres in Comparative examples 1 and 2. Furthermore, the microspheres in Examples 1 to 4 exhibit lower true specific gravity when they expand to maximum and have higher expansion ratio than the microspheres in Comparative examples 1 and 2.

Industrial Applicability

The heat-expandable microspheres of the present invention exhibit excellent expanding performance, especially in high temperature range, when they are used for reduced weight applications, and thus they are economical and useful. The method of producing the heat-expandable microspheres of the present invention can produce such microspheres efficiently.

What is claimed is:

1. A method of producing heat-expandable microspheres, each heat-expandable microspheres comprising a shell of thermoplastic resin, and a non-fluorine blowing agent encapsulated therein having a boiling point not higher than the softening point of the thermoplastic resin, the production method comprising the step of:
    dispersing an oily mixture that includes:
        a polymerizable component essentially comprising a carboxyl-group-containing monomer and a nitrile monomer that define a monomer component, and being free of a monomer reactive with the carboxyl group in the carboxyl-group-containing monomer;

the blowing agent; and
a polymerization initiator in an aqueous dispersing medium; and
polymerizing the polymerizable component;
wherein the carboxyl-group-containing monomer is in an amount of 20 to 75 weight percent of the monomer component;
wherein the nitrile monomer is in an amount of 25 to 60 weight percent of the monomer component;
wherein the monomer reactive with the carboxyl group in the carboxyl-group-containing monomer is selected from the group consisting of N-methylol (meth)acrylamide, N,N-dimethyl aminoethyl (meth)acrylate, N,N-dimethyl aminopropyl (meth)acrylate, magnesium mono(meth)acrylate, zinc mono(meth)acrylate, vinyl glycidyl ether, propenyl glycidyl ether, glycidyl (meth)acrylate, 2-hydroxyethyl (meth)acrylate, 2-hydroxypropyl (meth)acrylate, 2-hydroxybutyl (meth)acrylate, and 2-hydroxy-3-phenoxypropyl (meth)acrylate;
wherein the polymerization initiator contains at least one peroxydicarbonate selected from the group consisting of diethyl peroxydicarbonate, di-n-propyl peroxydicarbonate, bis(4-t-butylcyclohexyl) peroxydicarbonate, di-2-ethoxyethyl peroxydicarbonate, di-3-methoxybutyl peroxydicarbonate, di-sec-butyl peroxydicarbonate, di-2-ethylhexyl peroxydicarbonate, di-2-octyl peroxydicarbonate, dicycrohexyl peroxydicarbonate, and dibenzyl peroxydicarbonate; and
wherein the peroxydicarbonate constitutes 60 weight percent or more of the polymerization initiator.

2. A method of producing heat-expandable microspheres according to claim 1, wherein the heat-expandable microspheres have an expansion initiating temperature not lower than 110 deg.C.

3. A method of producing heat-expandable microspheres according to claim 1, wherein the aqueous dispersing medium further contains a water-soluble reductant.

* * * * *